United States Patent
Tsuji et al.

(10) Patent No.: US 9,960,710 B2
(45) Date of Patent: May 1, 2018

(54) AUTOMOTIVE VEHICLE INVERTER CONTROL APPARATUS

(75) Inventors: Masashige Tsuji, Hitachinaka (JP); Yasuo Noto, Hitachinaka (JP); Seiji Funaba, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 573 days.

(21) Appl. No.: 14/240,811

(22) PCT Filed: Jul. 19, 2012

(86) PCT No.: PCT/JP2012/068357
§ 371 (c)(1),
(2), (4) Date: Feb. 25, 2014

(87) PCT Pub. No.: WO2013/046880
PCT Pub. Date: Apr. 4, 2013

(65) Prior Publication Data
US 2014/0232181 A1 Aug. 21, 2014

(30) Foreign Application Priority Data
Sep. 27, 2011 (JP) .................................. 2011-210502

(51) Int. Cl.
B60R 16/02 (2006.01)
H02M 7/42 (2006.01)
(Continued)

(52) U.S. Cl.
CPC ......... H02M 7/537 (2013.01); B60L 11/1803 (2013.01); B60R 16/02 (2013.01); H02M 7/003 (2013.01); H02M 7/42 (2013.01)

(58) Field of Classification Search
CPC .................................. B60R 16/02; H02M 7/42
(Continued)

(56) References Cited

U.S. PATENT DOCUMENTS 6,504,267 B1 * 1/2003 Giannopoulos ... H02M 3/33561
 307/31
7,236,337 B2 * 6/2007 Minatani ............... B60L 3/0023
 361/18
(Continued)

FOREIGN PATENT DOCUMENTS

EP 1 696 546 A2 8/2006
JP 2006-238651 A 9/2006
(Continued)

OTHER PUBLICATIONS

International Search Report dated Oct. 9, 2012 w/ English translation (three (3) pages).

*Primary Examiner* — Adi Amrany
(74) *Attorney, Agent, or Firm* — Crowell & Moring LLP

(57) ABSTRACT

In an automotive vehicle inverter control apparatus of the related art, a limp-home mode is provided, but six power sources including transformers are required for respective gate circuits of the respective IGBT drive circuits. Therefore, a reduction in size and a reduction in weight cannot be achieved, and a demand of the improvement of mountability or the improvement of fuel consumption as described above cannot be satisfied. A power semiconductor module and the drive circuit include three unit semiconductor modules and three unit drive circuits corresponding to a three-phase alternating current, and power supply units of the unit drive circuits are provided independently, whereby the limp-home mode is provided and in addition, the number of power supply units may be reduced, so that the reduction in size and the reduction in weight are achieved.

4 Claims, 8 Drawing Sheets

(51) Int. Cl.
  *H02M 7/537* (2006.01)
  *H02M 7/00* (2006.01)
  *B60L 11/18* (2006.01)

(58) Field of Classification Search
  USPC .................................................. 307/9.1, 10.1
  See application file for complete search history.

(56) References Cited

U.S. PATENT DOCUMENTS

| | | | |
|---|---|---|---|
| 8,093,852 B2 | 1/2012 | Nakamura et al. | |
| 8,284,575 B2* | 10/2012 | Inamura | H02M 1/08 318/800 |
| 2006/0192509 A1 | 8/2006 | Nakakita et al. | |
| 2007/0058406 A1 | 3/2007 | Inoshita et al. | |
| 2008/0232073 A1 | 9/2008 | Nakakita et al. | |
| 2008/0253158 A1* | 10/2008 | Mochikawa | H02M 1/34 363/133 |
| 2009/0153223 A1* | 6/2009 | Bayerer | H03K 17/0406 327/389 |
| 2009/0195068 A1* | 8/2009 | Ohashi | H03K 17/162 307/18 |
| 2011/0012542 A1* | 1/2011 | Inamura | H02M 1/08 318/139 |
| 2012/0134181 A1* | 5/2012 | Amano | H02M 1/08 363/21.12 |
| 2013/0033914 A1* | 2/2013 | Yahata | H02M 7/48 363/132 |
| 2013/0328514 A1* | 12/2013 | Funaba | H02P 27/08 318/519 |

FOREIGN PATENT DOCUMENTS

| | | | | |
|---|---|---|---|---|
| JP | 2007-82281 A | | 3/2007 | |
| JP | 2008118815 A | * | 5/2008 | |
| JP | 2009-130967 A | | 6/2009 | |
| JP | 2010-245910 A | | 10/2010 | |
| JP | 2012120304 A | * | 6/2012 | ............. H02M 1/08 |

\* cited by examiner

AUTOMOTIVE VEHICLE INVERTER CONTROL APPARATUS

TECHNICAL FIELD

The present invention relates to an automotive vehicle inverter control apparatus configured to an electric motor which is mounted on an automotive vehicle and, more specifically, an automotive vehicle inverter control apparatus configured to drive and control the electric motor even when part of an inverter circuit has a failure.

BACKGROUND ART

Electric motors or the like used for a motive power that drives automotive vehicles such as electric vehicles or hybrid vehicles are driven at a high voltage such as several hundred volts.

Since a power source to be mounted on such automotive vehicles is a direct current battery, in order to drive the electric motor, it is necessary to convert the current to a three-phase current with an inverter circuit in which a switching element composed of a power semiconductor element such as an IGBT (insulated gate bipolar transistor) or the like is used.

A signal for driving the inverter circuit, for example, a drive signal for driving a gate of the IGBT is insulated from a high-voltage circuit that drives the electric motor, and is generated by a control circuit of a low-voltage circuit which is operated at a voltage lower than the voltage of the high-voltage circuit.

Therefore, in an inverter control apparatus that drives the electric motor is provided with an IGBT drive circuit configured to drive the IGBT of the inverter circuit on the basis of the drive signal. In other words, the inverter control apparatus of the electric motor includes an electric motor control circuit configured to drive in the low-voltage circuit, the IGBT drive circuit configured to be operated in the high-voltage circuit and drive the IGBT on the basis of the drive signal generated by the control circuit of the electric motor, and the inverter circuit including a plurality of IGBTs.

What is important in the automotive vehicle inverter control apparatus having such a configuration is safety and, specifically, failures of the IGBT drive circuit or the control apparatus are in question.

For example, the automotive vehicle inverter control apparatus which is currently proposed includes six IGBTs configured to cause the electric motor to be driven with the three-phase current. However, when one of the IGBTs is broken due to an event such as short-circuit or the like, the power source of the IGBT drive circuit is disabled, so that an entire gate circuit may be stopped. Therefore, the electric motor cannot keep on rotating, and hence the automotive vehicle cannot be moved any longer.

Therefore, if such failures occur in suburbs or in mountain areas, the automotive vehicle cannot be moved any longer, and a significant negative impact is exerted on safety or the like of a driver and a passenger. Therefore, a so-called limp-home mode, in which the automotive vehicle can be moved by rotating the electric motor in various degrees even though a failure occurs, is required.

Examples of the automotive vehicle inverter control apparatus provided with the limp-home mode as described above include a configuration in which power sources including independent six transformers are connected to respective gate circuits of respective IGBT in the IGBT drive circuit, so that even when one of the IGBTs is short-circuited or goes wrong, a remaining power source still works and hence the electric motor can be rotated by at least a two-phase coils among U-phase, V-phase, and a W-phase as described in JP-A-2009-130967 (PTL 1).

CITATION LIST

Patent Literature

PTL 1: JP-A-2009-130967

SUMMARY OF INVENTION

Technical Problem

The automotive vehicle inverter control apparatus having the limp-home mode as described above is in the environment in which the power inverter control apparatus is to be mounted in addition on the automotive vehicle. Therefore, a reduction in size, that is, an improvement of mountability by reducing the size, and a reduction in weight in order to improve the fuel consumption of a gasoline engine in a hybrid vehicles are required.

However, in the automotive vehicle inverter control apparatus described in Patent Literature 1, the limp-home mode is certainly provided, but the six power sources including transformers are required for the respective gate circuits of the respective IGBT drive circuits. Therefore, the reduction in size and the reduction in weight cannot be achieved, and a demand of the improvement of the mountability or the improvement of fuel consumption as described above cannot be satisfied.

It is an object of the present invention to provide an automotive vehicle inverter control apparatus in which limp-home mode is provided, and a reduction in size and a reduction in weight are improved.

Solution to Problem

The present invention provides an automotive vehicle inverter control apparatus including: a power semiconductor module including a power semiconductor element configured to convert a direct current into a three-phase alternating current and drives an electric motor; and a drive circuit configured to drive the power semiconductor module, characterized in that the power semiconductor module and the drive circuit include three unit semiconductor modules and three unit drive circuits corresponding to the three-phase alternating current, and respective power supply units of the unit drive circuits are provided independently.

Advantageous Effects of Invention

Even when the semiconductor module of one phase has a failure, since other two phases have specific direct current power sources independent from the faulty one-phase, and hence the operation is enabled without having an effect of the faulty IGBT. Therefore, the remaining two phases (V-phase and W-phase) are operable independently from the faulty one-phase (U-phase), so that an electric motor can keep on rotating.

In addition, by providing the three direct current power sources including specific independent transformers for the U-phase, the V-phase, and the W-phase in a power supply unit including the transformers, the size is reduced, and the weight is reduced. Therefore, the improvement of mountability and the improvement of the fuel consumption required for the automotive vehicle are satisfied.

DESCRIPTION OF EMBODIMENTS

The present invention will be described below in detail on the basis of embodiments, and a configuration of an automotive vehicle inverter control apparatus currently proposed and a situation of an occurrence of a failure will be described with reference to FIG. 8 for aiding understanding of the present invention.

Figure 8:
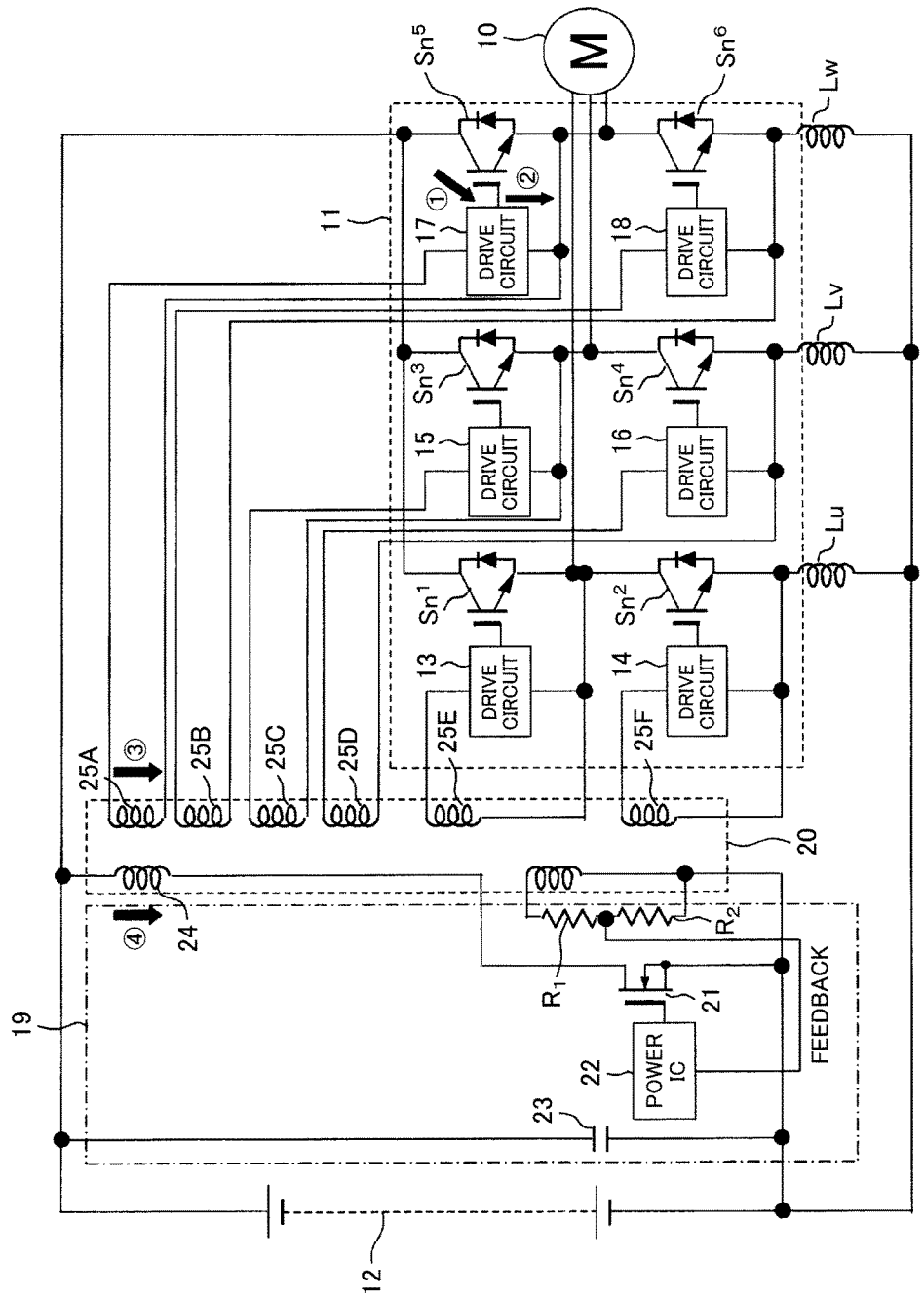
FIG. 8 is a drawing illustrating a circuit configuration of an automotive vehicle inverter control apparatus of the related art.

In FIG. 8, a principal circuit configuration of the automotive vehicle inverter control apparatus is illustrated. Reference numeral 10 denotes an electric motor configured to be operated with three-phase alternating current. The electric motor 10 is connected to an IGBT module 11, so that a rotary magnetic field is generated in a fixed-side inductive winding which constitutes the electric motor 10 by using a drive signal from the IGBT module 11 to rotate the electric motor 10.

The IGBT module 11 includes switching elements Sn1 to switching element Sn6 composed of six IGBTs. The six switching elements Sn1 to Sn6 constitute pairs to supply electric power to respective U-phase, V-phase, and W-phase windings of the electric motor 10.

Then, collector sides of the switching element Sn1, the switching element Sn3, and the switching element Sn5 are connected to a direct current power source 12, and emitters of the switching element Sn2, the switching element Sn4, and the switching element Sn6 are grounded via inductances Lu, Lv, Lw. The inductances are inductances for wiring.

The direct current power source 12 to which the collector sides of the switching element Sn1, the switching element Sn3, and the switching element Sn5 are connected, for example, secures a high-voltage direct current power source by connecting a plurality of lithium ion batteries in series.

An emitter of the switching element Sn1 and a collector of the switching element Sn2 are connected, and a switching element composed of this pair controls electric power of the U-phase winding and, in the same manner, an emitter of the switching element Sn3 and a collector of the switching element Sn4 are connected, and a switching element composed of this pair controls electric power of the V-phase winding and, in the same manner, an emitter of the switching element Sn5 and a collector of the switching element Sn6 are connected and a switching element composed of this pair controls electric power of the W-phase winding. The configurations described above are configurations which are already known.

Furthermore, a drive circuit 13 to a drive circuit 18 which function as gate drivers are connected to gates of the switching elements Sn1 to the switching elements Sn6, and the drive circuit 13 to the drive circuit 18 generate U-phase, V-phase, and W-phase winding drive signals.

The power sources of the drive circuit 13 to the drive circuit 18 are supplied by a common power supply unit 19, and the power supply unit 19 includes a transformer unit 20, a switching element 21 composed of a MOS type FET configured to control an electrical energy supply to the transformer unit 20, a power IC 22, and a capacitor 23.

The transformer unit 20 includes one common primary winding 24 and six secondary winding 25A to secondary winding 25F connected to each of the drive circuit 13 to the drive circuit 18.

The configurations of these members are also known configurations and the operation thereof is also known. Therefore, description of the operation is omitted here, but the situation of an occurrence of the failure will be described below.

For example, when the W-phase switching element Sn5 is broken by some reasons, energy thereof breaks a gate oxidized film of the switching element Sn5 easily, and a high-voltage such as an arrow (1) (in the drawing, the numeral is surrounded by a circle) is applied from the collector to a base side of the switching element Sn5.

Here, the drive circuit 17 is normally configured so as to be operated by a voltage on the order of a maximum gate voltage of the switching element Sn5. Therefore, when the high-voltage, described above, is applied, the drive circuit 17 connected to the switching element Sn5 is destroyed, and short-circuit current flows as indicated by an arrow (2) (in the drawing, the numeral is surrounded by a circle). The short-circuit current causes a flow of electric current in the direction indicated by an arrow (3) (in the drawing, the numeral is surrounded by a circle) in the secondary winding 25A connected to the drive circuit 17 of the transformer unit 20.

In contrast, the electric current to the common primary winding 24 of the transformer unit 20 flows as indicated by an arrow (4) (in the drawing, the numeral is surrounded by a circle). However, most part of electric energy is consumed by the flow of the electric current as indicated by the arrow (3) of the secondary winding 25A, and outputs from terminals of other secondary winding 24B to secondary winding 24F are not generated.

Consequently, the drive circuit 13 to the drive circuit 18 are faulty to be operated, so that a power supply to the electric motor 10 is disrupted. In this manner, the power sources of other U-phase and V-phase other than the faulty W-phase of the switching element Sn5 are lost in addition to that of W-phase, which are required for the electric motor 10 to continue its rotation, and hence the electric motor 10 is obliged to stop.

Therefore, if such failures occur in suburbs or in mountain areas, the automotive vehicle cannot be moved any longer, and a significant negative impact is exerted on safety or the like of a driver and a passenger. Therefore, a so-called limp-home mode, in which the automotive vehicle can be moved by rotating the electric motor, is required.

As a countermeasure for such an event, there is employed a configuration in which power sources including independent six transformers are connected to respective gate circuits of respective IGBT, so that even when any one of the IGBTs is short-circuited or goes wrong, a remaining power source still works and hence the electric motor can be rotated by at least two-phase windings among U-phase, V-phase, and a W-phase as described in Patent Literature 1.

The automotive vehicle inverter control apparatus having the limp-home mode as described above is in the environment in which the power inverter control apparatus is to be mounted as described above on the automotive vehicle. Therefore, a reduction in size, that is, improvement of mountability by reducing the size, and a reduction in weight in order to improve fuel consumption of a gasoline engine in hybrid vehicles are required.

However, in the automotive vehicle inverter control apparatus described in Patent Literature 1, the limp-home mode is certainly provided, but the six power sources including transformers are required for the respective gate circuits. Therefore, the reduction in size and the reduction in weight cannot be achieved, and a demand of the improvement of the mountability or the improvement of fuel consumption as described above cannot be satisfied.

Subsequently, an embodiment of the automotive vehicle inverter control apparatus which is provided with the limp-home mode as described above, and which responds to the demand of the reduction in size and the reduction in weight will be described.

[First Embodiment]

Figure 1:
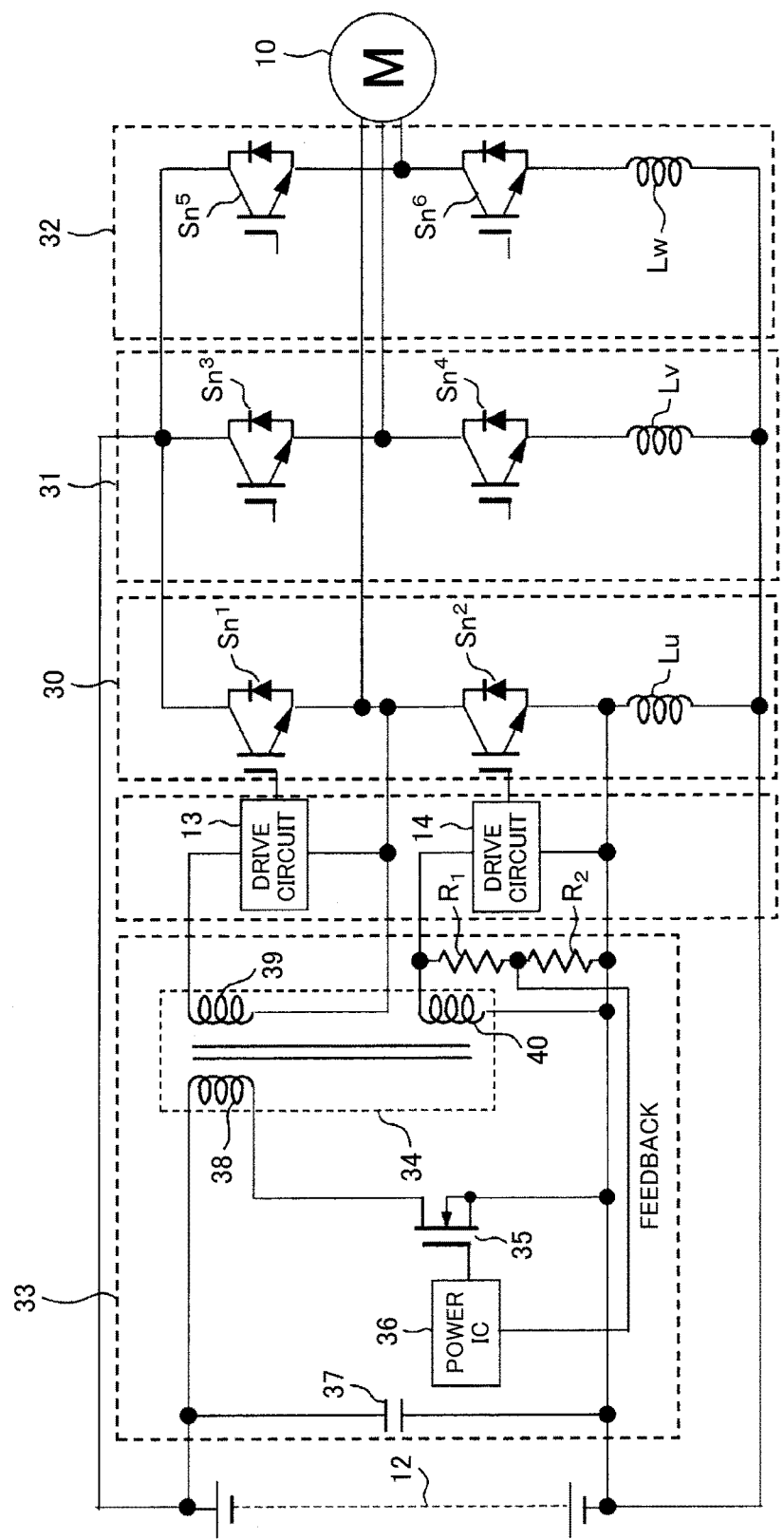
FIG. 1 is a drawing illustrating a circuit configuration of an automotive vehicle inverter control apparatus according to an embodiment of the present invention.

Although the circuit configuration of the automotive vehicle inverter control apparatus according to the embodiment of the present invention is illustrated in FIG. 1. However, reference numerals common to those of the components illustrated in FIG. 1 indicate the same components or components having the same functions.

In FIG. 1, reference numeral 30 denotes a unit semiconductor module (hereinafter, referred to as a unit IGBT module) including a pair of the switching element Sn1 and the switching element Sn2 configured to control U-phase power and, in the same manner, a unit IGBT module 31 includes a pair of the switching element Sn3 and the switching element Sn4 configured to control V-phase power, and a unit IGBT module includes a pair of the switching element Sn5 and the switching element Sn6 configured to control W-phase power.

The switching element Sn1 of the unit IGBT module 30 is connected to the drive circuit 13, the switching element Sn2 is connected to the drive circuit 14, and the drive circuit 13 and the drive circuit 14 are provided as unit drive circuits corresponding to the unit IGBT module 30.

The drive circuit 15 and the drive circuit 16 of the switching element Sn3 and the switching element Sn4 of the unit IGBT module 31 and the drive circuit 17 and the drive circuit 18 of the switching element Sn5 and the switching element Sn6 of the unit IGBT module 32 are also configured as unit drive circuits as a matter of course.

Then, the fact that the unit drive circuit of the respective IGBT module 30 to the unit IGBT module 32 are each provided with an independent power supply unit 33 is a characteristic part of this invention.

In FIG. 1, the independent power supply unit 33 specific for the unit drive circuit of the IGBT module 30 is illustrated, and the independent power supply units specific for the unit drive circuits of the IGBT module 31 and the IGBT module 32 have the same configuration, although the illustration is omitted.

The power supply unit 33 includes a transformer unit 34, a switching element 35 composed of MOS FET configured to control an electrical energy supply to the transformer unit 34, a power IC 36, and a capacitor 37.

The transformer unit 34 includes an iron core, a single primary winding 38 electromagnetically coupled to the iron core, a secondary winding 39 electromagnetically coupled to the iron core and connected to the drive circuit 13, and a secondary winding 40 electromagnetically coupled to the iron core and connected to the drive circuit 14. Accordingly, the power sources of the drive circuit 13 and the drive circuit 14 are secured specifically and independently.

The inductance Lu is an inductance of wiring, whereby an ground point of the drive circuit 14 is determined with the emitter of the switching element Sn2 as one-point ground so that the power source of the drive circuit 14 does not change. Other IGBT module 31 and the IGBT module 32 are the same.

Divided resistances R1 and R2 for a feedback signal are provided between the secondary winding 40 on an input side of the drive circuit 14 and the ground, and the power IC 36 drives the MOS FET 35 and controls the voltage to the drive circuit 14 to be constant by an intermediate voltage signal between the divided resistances R1 and R2.

The electric energy input from the direct current power source 12 is accumulated in the capacitor 37, is converted into voltage, and is applied to the drive circuit 13 and the drive circuit 14 via the transformer unit 34. Then, the drive circuit 13 and the drive circuit 14 drive the switching element Sn1 and the switching element Sn2 and supplies electric power to the U-phase winding of the electric motor 10.

The winding ratio of the secondary winding 39 of the transformer unit 34 connected to the drive circuit 13 with respect to the primary winding is set to the same winding ratio of the secondary winding 40 connected to the drive circuit 14, so that the same voltage is output.

In the configuration described above, in order to continue the rotation of the electric motor 10 even though one of the switching element Sn1 to the switching element Sn6 has a failure, it is necessary that two phases (for example, the V-phase and the W-phase) other than the one phase (for example, U-phase) that has been controlled by the faulty switching element are operable, and the normal switching element Sn2 pairing up with the faulty switching element Sn1 is turned OFF.

Accordingly, when the gate of the faulty U-phase switching element Sn1 is short circuited, short circuit current flows through the secondary winding 39 that is connected to the drive circuit 13 of the faulty switching element Sn1 and the electric energy input to the primary winding is consumed, so that an operation to prevent the drive circuit 14 connected to the normal switching element Sn2 which is a companion of the pair from being supplied with power. In other words, when the switching element Sn1, which is one of the pair, has a failure and is short-circuited, the normal switching element Sn2 which is a companion of the pair is turned OFF.

In contrast, since other two phases have specific direct current power sources independent from the faulty one-phase, and hence the operation is enabled without having an effect of the faulty IGBT. Therefore, the remaining two phases (V-phase and W-phase) are operable independently from the faulty one-phase (U-phase), so that the electric motor 10 can keep on rotating.

In this manner, even when a failure occurs in suburbs or in mountains areas, the automotive vehicle can be moved by rotating the electric motor, which contributes to the improvement of safety of the driver or the passenger significantly.

In addition, by providing the three direct current power sources including specific independent transformers for the U-phase, the V-phase, and the W-phase in the power supply unit including the transformers, the size is reduced, and the weight is reduced in comparison with the case where six power sources are provided for each of the drive circuits that drive the gates of the respective switching elements. Therefore, demands such as an improvement of mountability and an improvement of the fuel consumption required for the automotive vehicle are satisfied.

[Second Embodiment]

The basic circuit configuration of the present invention has been described thus far, and a more advantageous arrangement of the circuit components in the case where the automotive vehicle inverter control apparatus including the circuit configuration described above is mounted actually on the automotive vehicle will be described.

Figure 2:
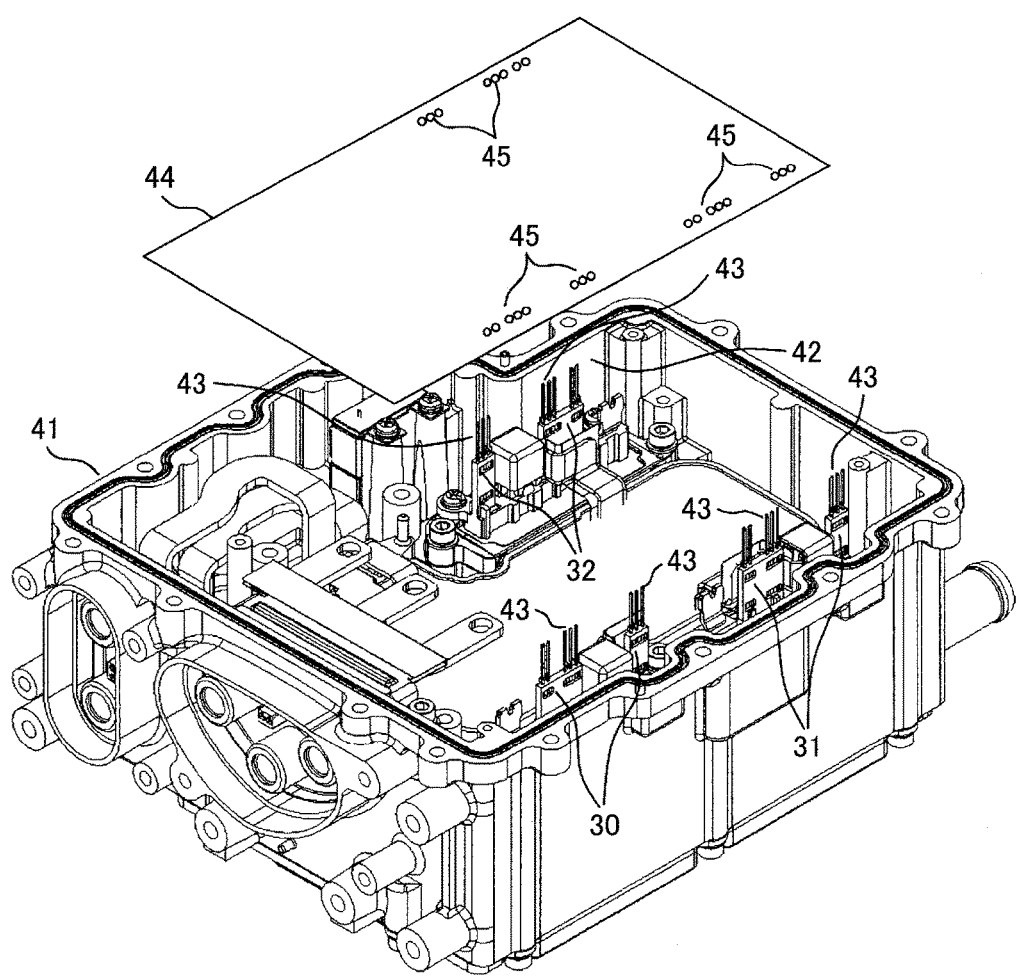
FIG. 2 is an exploded perspective view of the automotive vehicle inverter control apparatus having the circuit configuration illustrated in FIG. 1.

FIG. 2 is an exploded perspective view of the automotive vehicle inverter control apparatus viewed from an oblique direction, and, specifically illustrates an interior of a case in which mounted circuits are stored.

In FIG. 2, an IGBT module configured to drive the electric motor 10, a bus bar configured to feed electricity at a high voltage to the electric motor 10, and a cooling mechanism configured to cool the IGBT module are arranged in the interior of a metal-made case 41. However, these members are not related significantly to the present invention, and hence detailed description will be omitted.

On inner peripheral walls of outer walls 42 of the case 41, which oppose each other, the IGBT module 30 including the pair of the switching element Sn1 and the switching element Sn2, the IGBT module 31 including the pair of the switching element Sn3 and the switching element Sn4, and the IGBT module 32 including the pair of the switching element Sn5 and the switching element Sn6 are mounted so as to be capable of heatsinking.

A control terminal 43 is provided on each of the switching element Sn1 to the switching element Sn6, and the control terminals 43 extend along an outer wall of the case 41. These control terminals 43 are inserted into terminal holes 45 of a control substrate 44 and electrically connected to the circuit components of the control substrate by soldering or the like.

Figure 3:
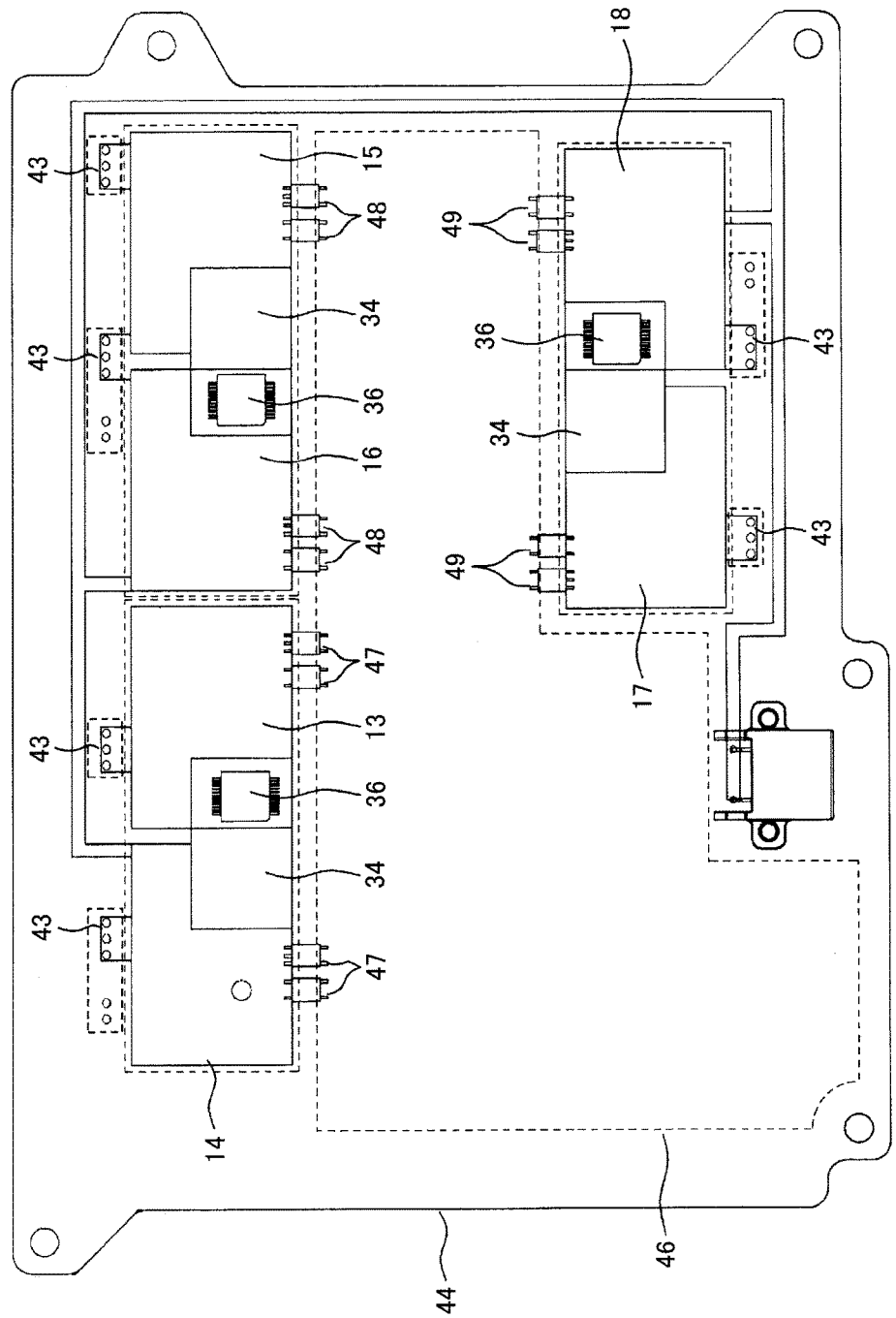
FIG. 3 is a configuration drawing of a circuit board illustrating a state of arrangement of circuit components of the automotive vehicle inverter control apparatus illustrated in FIG. 2.

FIG. 3 illustrates a mounted surface on which a state of arrangement of the circuit components of the control substrate 44 is illustrated, and the mounted surface faces inside of the case 41 in FIG. 2. In other words, in this configuration, the circuit components of the control substrate 44 are stored in the case 41.

In FIG. 3, a low voltage control circuit unit 46 configured to generate a control signal of the electric motor 10 is arranged in the vicinity of a center of the control substrate 44, and the drive circuits and the power supply units for the respective IGBT modules are arranged outside of one side of the opposing sides of the low voltage control circuit unit 46.

Specifically, the drive circuit 13 configured to drive the U-phase switching element Sn1, and the drive circuit 14 configured to drive the switching element Sn2, which is the companion of the switching element Sn1, are arranged on the upper left of the outside of one side of the low voltage control circuit unit 46 illustrated in FIG. 3. Control terminals of the IGBTs, which correspond to the switching element Sn1 and the switching element Sn2, are electrically connected to each of the drive circuit 13 and the drive circuit 14.

Then, the transformer unit 34 which constitutes the power supply unit 33 and the power IC 36 having the MOS FET switching element 35 integrated therein are arranged between the drive circuit 13 and the drive circuit 14. The power IC 36 may be provided separately from the switching element 35, and in this case, the switching element 35 is arranged near the power IC 36.

Here, the transformer unit 34 and the power IC 36 which constitute the power supply unit 33 are arranged adjacent to the low voltage control circuit unit 46.

In the same manner, the drive circuit 15 configured to drive the V-phase switching element Sn3, and the drive circuit 16 configured to drive the switching element Sn4, which is the companion of the switching element Sn3, are arranged on the upper right of the outside of one side of the low voltage control circuit unit 46 illustrated in FIG. 3. Control terminals of the IGBTs, which correspond to the switching element Sn3 and the switching element Sn4, are electrically connected to each of the drive circuit 15 and the drive circuit 16.

The transformer unit 34 which constitutes the power supply unit 33, which is specific for the V-phase, and the power IC 36 having the MOS FET switching element 35 integrated therein are arranged between the drive circuit 15 and the drive circuit 16. The power IC 36 may be provided separately from the switching element 35, and in this case, the switching element 35 is arranged near the power IC 36.

Here as well, the transformer unit 34 and the power IC 36 which constitute the power supply unit 33 are arranged adjacent to the low voltage control circuit unit 46.

Therefore, the drive circuits of two phases, that is, the U-phase and the V-phase, and the power supply units are arranged on one side of the low voltage control circuit unit 46, and this configuration is suitable for the mounting shape of the case 41 which is a rectangular shape. What is remained is only one phase, that is, the W-phase, which can be accommodated in the rectangular case, as a matter of course.

In addition, the drive circuit 17 configured to drive the W-phase switching element Sn5, and the drive circuit 18 configured to drive the switching element Sn6, which is the companion of the switching element Sn5, are arranged on the lower right of the outside of the other side of the low voltage control circuit unit 46 illustrated in FIG. 3. Control terminals of the IGBTs, which correspond to the switching element Sn5 and the switching element Sn6, are electrically connected to each of the drive circuit 17 and the drive circuit 18.

The transformer unit 34 which constitutes the power supply unit 33, which is specific for the W-phase, and the power IC 36 having the MOS FET switching element 35 integrated therein are arranged between the drive circuit 17 and the drive circuit 18. The power IC 36 may be provided separately from the switching element 35, and in this case, the switching element 35 is arranged near the power IC 36.

Here as well, the transformer unit 34 and the power IC 36 which constitute the power supply unit 33 are arranged adjacent to the low voltage control circuit unit 46.

As is understood from FIG. 3, the drive circuit 13 and the drive circuit 14 have substantially the same shape when viewing the paper plane, and, in addition, are arranged symmetrically with respect to the transformer 34 and the power IC 36 as a boundary. In the same manner, the drive circuit 15 and the drive circuit 16, and the drive circuit 17 and the drive circuit 18 have substantially the same shape when viewing the paper plane, and, in addition, are arranged symmetrically with respect to the transformer 34 and the power IC 36 as a boundary.

The connecting terminals 43 of the respective IGBT modules 30, 31, 32 are configured to be connected on an outer peripheries of the drive circuit 13 to the drive circuit 18, respectively.

Electrical transmission of control signals between the low voltage control circuit unit 46 and each of the drive circuit 13 to the drive circuit 18 is performed by U-phase photo couplers 47, V-phase photo couplers 48, and W-phase photo couplers 49 interposed between the low voltage control circuit unit 46 and each of the drive circuit 13 to the drive circuit 18.

The arrangement of the circuit components of the control substrate 44 as described above is mainly characterized in that (1) the drive circuit 13 to the drive circuit 18 are arranged on the sides of the low voltage control circuit unit 46 opposing each other, (2) the transformer units and the power IC (if the MOS FET is not integrated, the MOS FET is arranged separately) as the power supply units specific for the respective phases are arranged between the drive circuits of the switching element pairs in the respective phases, (3) the transformer units and the power ICs, which are the power supply units specific for the respective phases, are arranged adjacent to the low voltage control circuit unit 46, (4) connecting portions to the switching elements composed of the IGBTs are arranged outside of the drive circuit 13 to the drive circuit 18 respectively, and (5) the drive circuits which constitute the pairs of the respective phases have the substantially same shape, and arranged symmetrically with respect to the transformer units and the power ICs as a boundary.

With the arrangement structure described above, the power supply units and the drive circuits may be arranged rationally and independently for the respective phases.

The low voltage control circuit unit 46, the photo coupler 47 to the photo coupler 49, the drive circuit 13 to the drive circuit 18, and the connecting terminals of the IGBT modules are arranged in this order so as to increase in potential in this direction, therefore, an advantageous arrangement is achieved while securing electrical insulation.

Furthermore, since the two-phase drive circuits or the like are arranged side by side, application is easily achieved when a rectangular case is requested in a layout in terms of mounting on the automotive vehicle.

Furthermore, since the drive circuits which constitute the pairs of the respective phases have the substantially same shape, and are arranged symmetrically with respect to the transformer units and the power ICs as a boundary, high productivity is achieved.

[Third Embodiment]

Subsequently, another advantageous arrangement of the circuit components in the case where the automotive vehicle inverter control apparatus is mounted actually on the automotive vehicle will be described.

Figure 4:
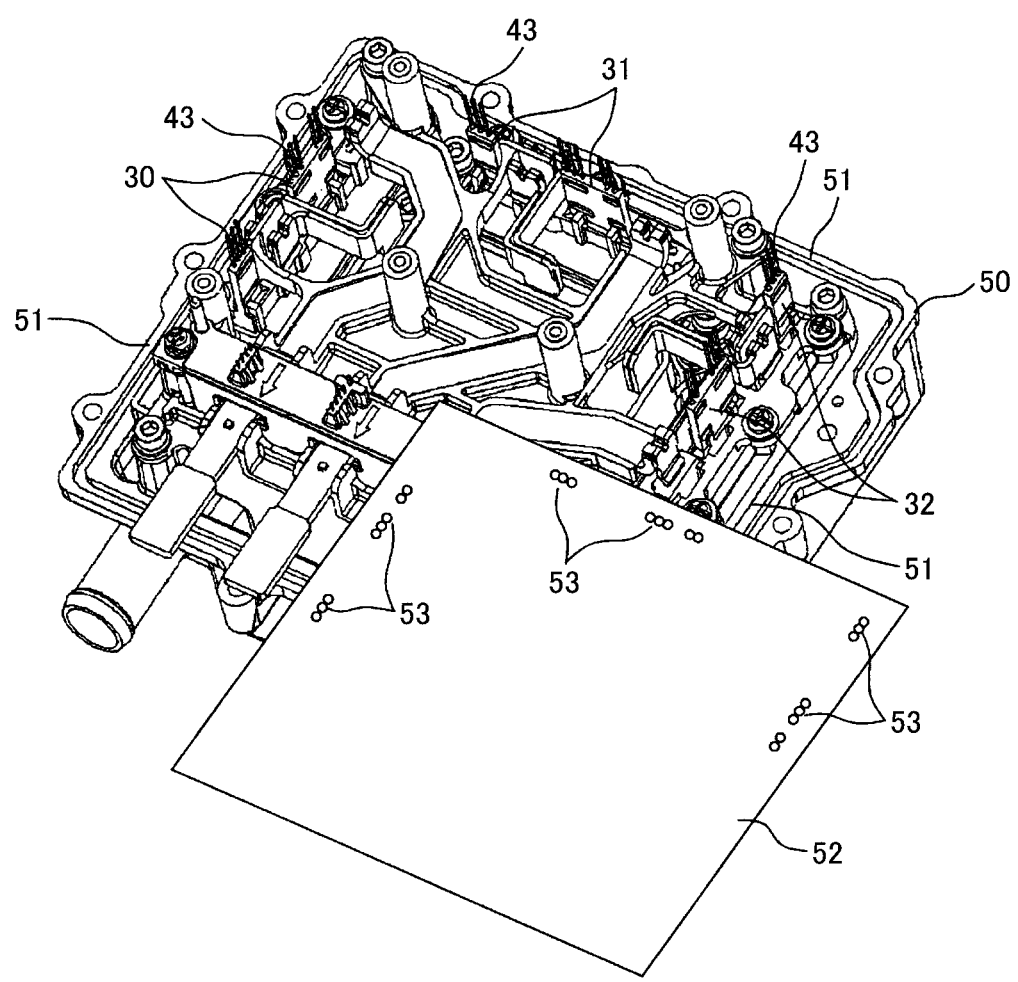
FIG. 4 is an exploded perspective view of an automotive vehicle inverter control apparatus according to another embodiment of the present invention.

FIG. 4 is an exploded perspective view of the automotive vehicle inverter control apparatus viewed from an oblique direction, and illustrates specifically an interior of a case in which mounted circuits are stored in the same manner as FIG. 2.

In FIG. 4, an IGBT module configured to drive the electric motor 10, a bus bar configured to feed electricity at a high voltage to the electric motor 10, and a cooling mechanism configured to cool the IGBT module are arranged in the interior of a metal-made case 50. However, detailed description will be omitted.

On inner peripheral walls of three outer walls 51 of the case 50, the IGBT module 30 including the pair of the switching element Sn1 and the switching element Sn2, the IGBT module 31 including the pair of the switching element Sn3 and the switching element Sn4, and the IGBT module 32 including the pair of the switching element Sn5 and the switching element Sn6 are mounted on each side so as to be capable of heatsinking.

The control terminal 43 is provided on each of the switching element Sn1 to the switching element Sn6, and the control terminals 43 extend along an outer wall of the case 50. These control terminals 43 are inserted into terminal holes 53 of a control substrate 52 and electrically connected to the circuit components of the control substrate by soldering or the like.

Figure 5:
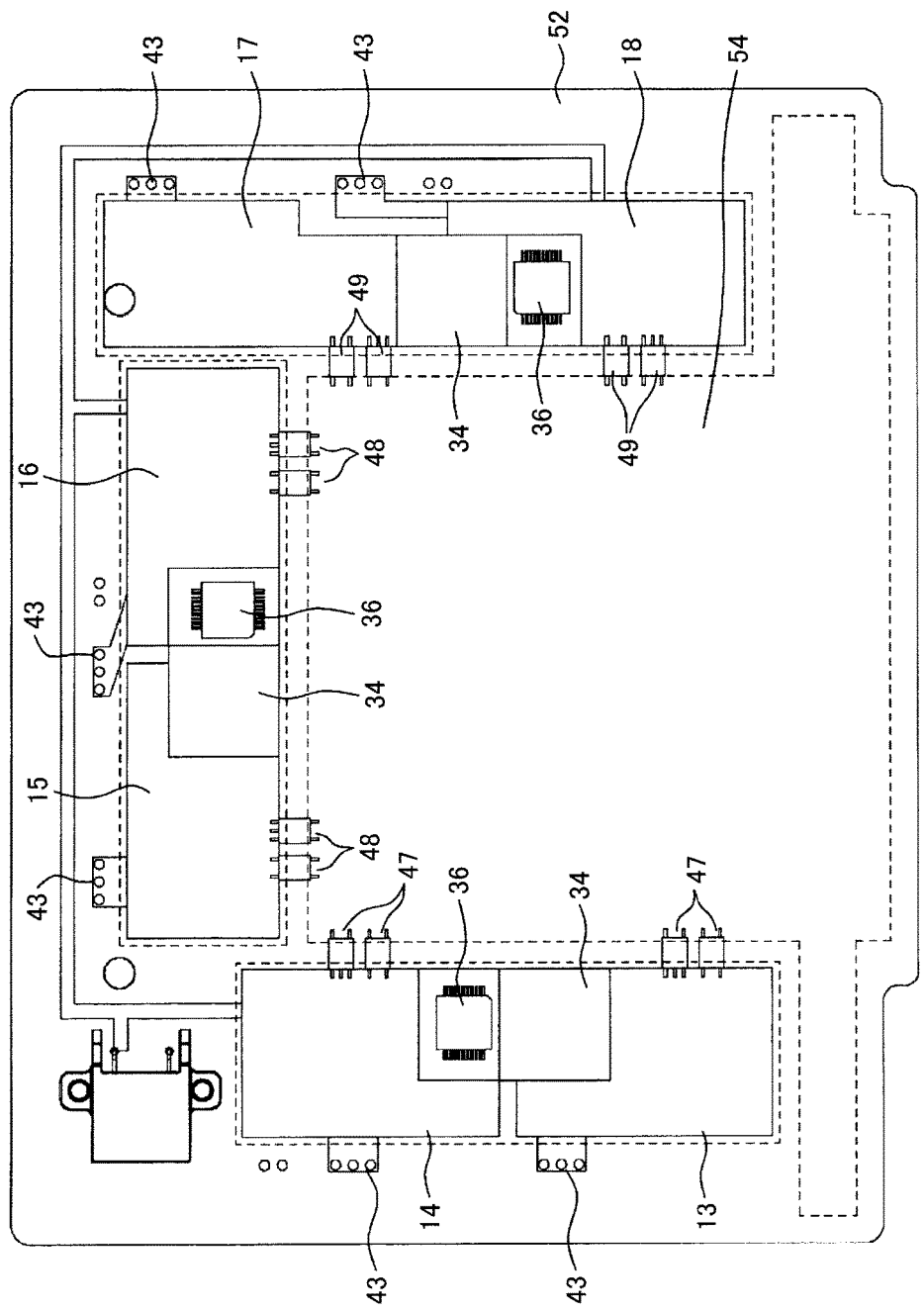
FIG. 5 is a configuration drawing of a circuit board illustrating a state of arrangement of circuit components of the automotive vehicle inverter control apparatus illustrated in FIG. 4.

FIG. 5 illustrates a mounted surface on which a state of arrangement of the circuit components of the control substrate 52 is illustrated, and the mounted surface faces inside of the case 50 in FIG. 4. In other words, in this configuration, the circuit components of the control substrate 52 are stored in the case 50.

In FIG. 5, a low voltage control circuit unit 54 having a substantially rectangular shape as a shape for generating a control signal of the electric motor 10 is arranged near one side of the control substrate 52, and the drive circuits and the power supply units for the respective IGBT modules are arranged outside around the three sides.

Specifically, the drive circuit 13 configured to drive the U-phase switching element Sn1, and the drive circuit 14 configured to drive the switching element Sn2, which is the companion of the switching element Sn1, are arranged on the left side of one side of the low voltage control circuit unit 54 arranged on the control substrate 52 illustrated in FIG. 5. The control terminals 43 of the IGBTs, which correspond to the switching element Sn1 and the switching element Sn2, are electrically connected to the outer peripheral side of each of the drive circuit 13 and the drive circuit 14.

The transformer unit 34 which constitutes the power supply unit 33 and the power IC 36 having the MOS FET switching element 35 integrated therein are arranged between the drive circuit 13 and the drive circuit 14. The power IC 36 may be provided separately from the switching element 35, and in this case, the switching element 35 is arranged near the power IC 36.

Here, the transformer unit 34 and the power IC 36 which constitute the power supply unit 33 are arranged adjacent to the left side of the low voltage control circuit unit 54.

In the same manner, the drive circuit 15 configured to drive the V-phase switching element Sn3, and the drive circuit 16 configured to drive the switching element Sn4, which is the companion of the switching element Sn3, are arranged on one side of the upper center side of the low voltage control circuit unit 54 arranged on the control substrate 52 illustrated in FIG. 5. The control terminals 43 of the IGBTs, which correspond to the switching element Sn3 and the switching element Sn4, are electrically connected to the outer peripheral side of each of the drive circuit 15 and the drive circuit 16.

The transformer unit 34 which constitutes the power supply unit 33, which is specific for the V-phase, and the power IC 36 having the MOS FET switching element 35 integrated therein are arranged between the drive circuit 15 and the drive circuit 16. The power IC 36 may be provided separately from the switching element 35, and in this case, the switching element 35 is arranged near the power IC 36.

Here as well, the transformer unit 34 and the power IC 36 which constitute the power supply unit 33 are arranged adjacent to one side of the upper center side of the low voltage control circuit unit 54.

Furthermore, the drive circuit 17 configured to drive the W-phase switching element Sn5, and the drive circuit 18 configured to drive the switching element Sn6, which is the companion of the switching element Sn5, are arranged on the right side of one side of the low voltage control circuit unit 54 arranged on the control substrate 52 illustrated in FIG. 5. The control terminals 43 of the IGBTs, which correspond to the switching element Sn5 and the switching element Sn6, are electrically connected to the outer peripheral side of the drive circuit 17 and the drive circuit 18.

The transformer unit 34 which constitutes the power supply unit 33, which is specific for the W-phase, and the power IC 36 having the MOS FET switching element 35 integrated therein are arranged between the drive circuit 17 and the drive circuit 18. The power IC 36 may be provided separately from the switching element 35, and in this case, the switching element 35 is arranged near the power IC 36.

Here as well, the transformer unit 34 and the power IC 36 which constitute the power supply unit 33 are arranged adjacent to one side on the right side of the low voltage control circuit unit 54.

Electrical transmission of control signals between the low voltage control circuit unit 54 and each of the drive circuit 13 to the drive circuit 18 is performed by the U-phase photo couplers 47, the V-phase photo couplers 48, and the W-phase photo couplers 49 interposed between the low voltage control circuit unit 54 and the drive circuit 13 to the drive circuit 18.

The arrangement of the circuit components of the control substrate 52 as described above is mainly characterized in that (1) the drive circuit 13 to the drive circuit 18 of the respective phases are arranged on the three sides of the low voltage control circuit unit 54, respectively, (2) the transformer units and the power IC (if the MOS FET is not integrated, the MOS FET is arranged separately) as the power supply units specific for the respective phases are arranged between the drive circuits of the switching element pairs in the respective phases, (3) the transformer units and the power ICs, which are the power supply units specific for the respective phases, are arranged adjacent to the low voltage control circuit unit 54, and (4) the connecting portions to the switching elements composed of the IGBTs are arranged outside of the drive circuit 13 to the drive circuit 18 respectively.

In this embodiment as well, as illustrated in the second embodiment, a configuration in which the drive circuit 13 and the drive circuit 14, the drive circuit 15 and the drive circuit 16, and the drive circuit 17 and the drive circuit 18 have the substantially the same shape when viewing the paper plane, and, in addition, are arranged symmetrically with respect to the transformer unit 34 and the power IC 36 as a boundary is also applicable.

With the arrangement structure described above, the power supply units and the drive circuits may be arranged rationally and independently for the respective phases.

The low voltage control circuit unit 54, the photo coupler 47 to the photo coupler 49, the drive circuit 13 to the drive circuit 18, and the connecting terminals of the IGBT modules are arranged in this order so as to increase in potential in this direction, therefore, an advantageous arrangement is achieved while securing the electrical insulation.

Furthermore, since the three-phase drive circuits or the like are arranged separately in each of the three sides of the low voltage control circuit unit 54, application is easily achieved when a square case is requested in a layout in terms of mounting on the automotive vehicle.

In addition, since drive signal wiring from the low voltage control circuit unit 54 can be distributed uniformly for the drive circuits of the respective phases and also can be shortened, advantages that degradation of the signal or a delay of signal transmission caused by an increase of the wiring length of the control signal or the drive signal, and a difference of signal delay among the drive circuits may be prevented are expected.

[Fourth Embodiment]

Subsequently, still another advantageous arrangement of the circuit components in the case where the automotive vehicle inverter control apparatus is mounted actually on the automotive vehicle will be described.

Figure 6:
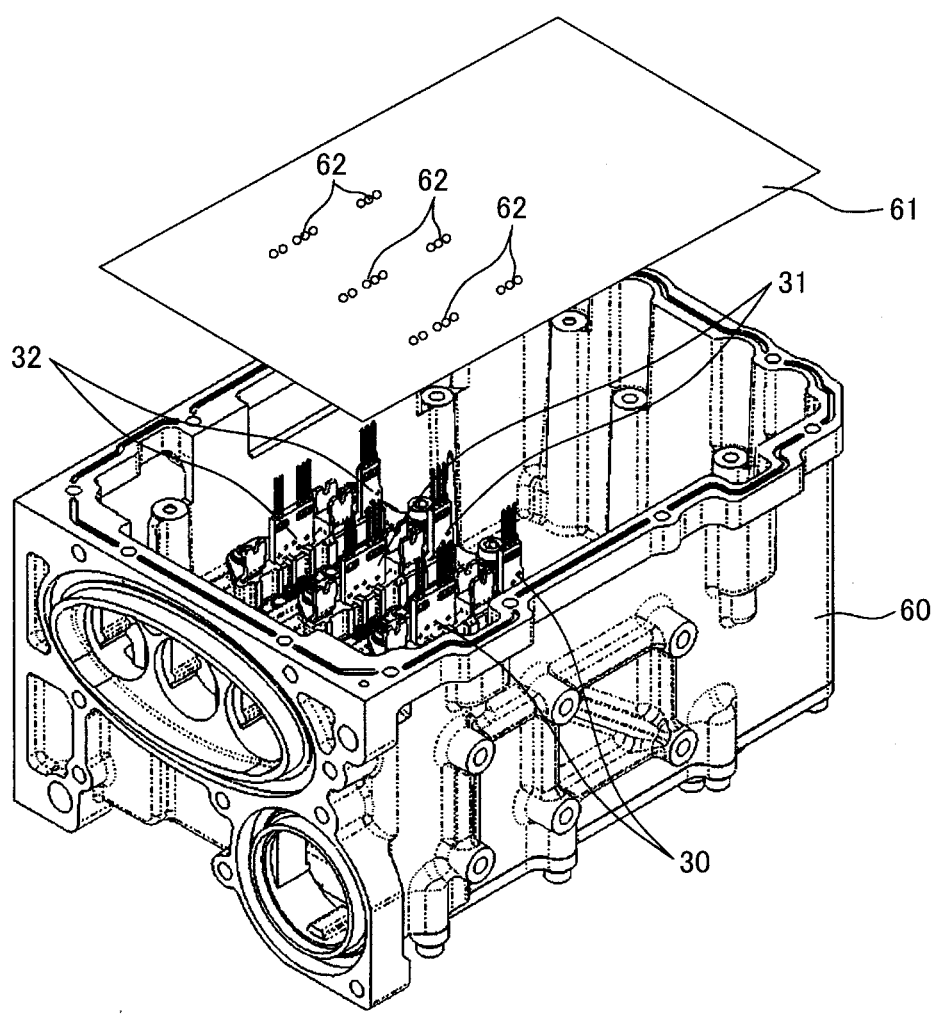
FIG. 6 is an exploded perspective view of an automotive vehicle inverter control apparatus according to still another embodiment of the present invention.

FIG. 6 is an exploded perspective view of the automotive vehicle inverter control apparatus viewed from an oblique direction, and, specifically, illustrates an interior of a case in which mounted circuits are stored in the same manner as FIG. 2.

In FIG. 6, an IGBT module configured to drive the electric motor 10, a bus bar configured to feed electricity at a high voltage to the electric motor 10, and a cooling mechanism configured to cool the IGBT module are arranged in the interior of a metal-made case 60. However, detailed description will be omitted.

On an internal space area on the left side of the case 60, the IGBT module 30 including the pair of the switching element Sn1 and the switching element Sn2, the IGBT module 31 including the pair of the switching element Sn3 and the switching element Sn4, and the IGBT module 32 including the pair of the switching element Sn5 and the switching element Sn6 are mounted in a line.

As described above, the control terminal 43 is provided on each of the switching element Sn1 to the switching element Sn6, and the control terminals 43 extend along an opening end of the case 60. These control terminals 43 are inserted into terminal holes 62 of a control substrate 61 and electrically connected to the circuit components of the control substrate 61 by soldering or the like.

Figure 7:
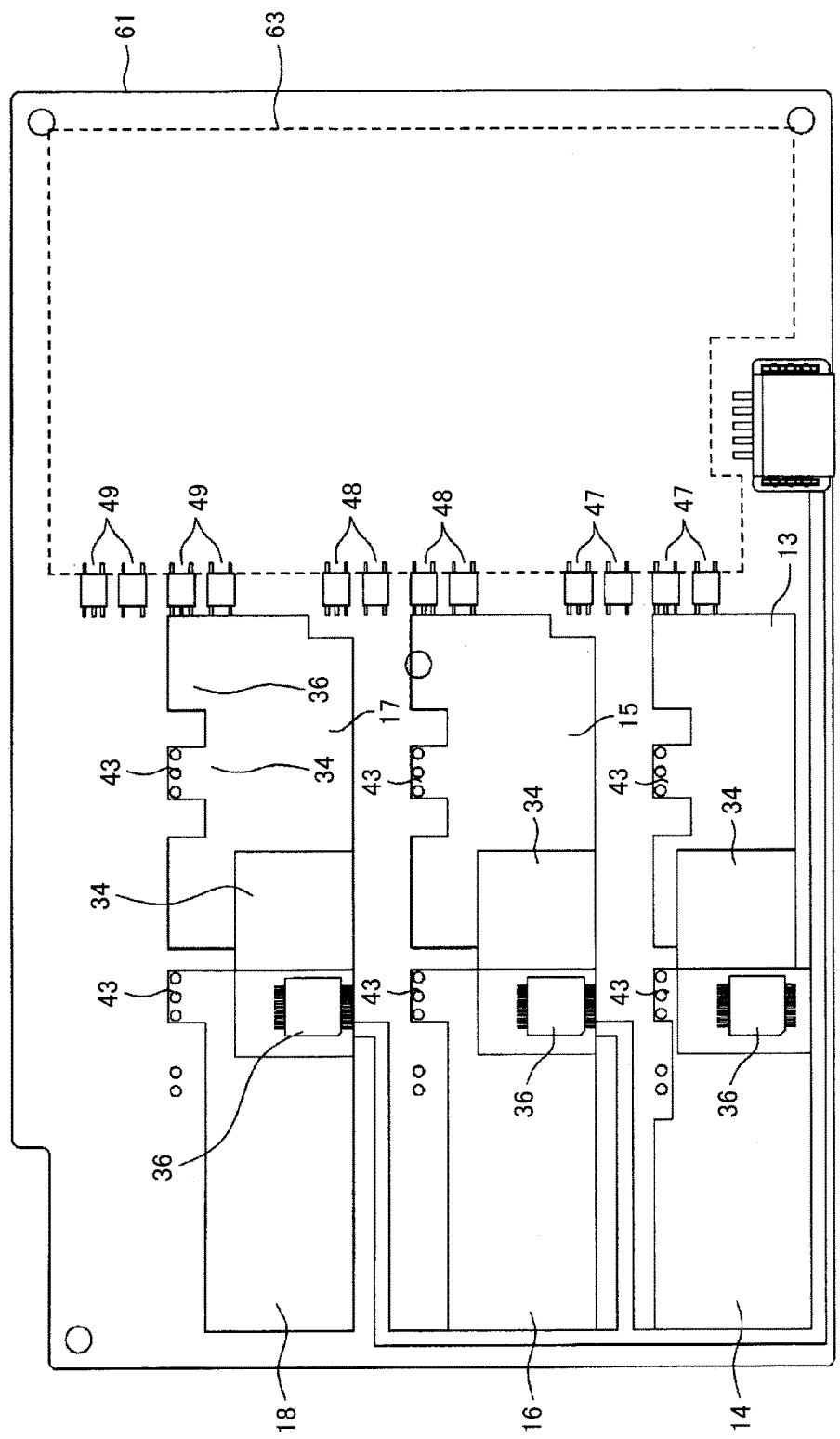
FIG. 7 is a configuration drawing of a circuit board illustrating a state of arrangement of circuit components of the automotive vehicle inverter control apparatus illustrated in FIG. 6.

FIG. 7 illustrates a mounted surface on which a state of arrangement of the circuit components of the control substrate 61 is illustrated, and the mounted surface faces inside of the case 60 in FIG. 6. In other words, in this configuration, the circuit components of the control substrate 61 are stored in the case 60.

In FIG. 7, a low voltage control circuit unit 63 configured to generate a control signal of the electric motor 10 is arranged at a position against a right area of the control substrate 61, and the drive circuits and the power supply units for the respective IGBT modules are arranged in a left side area of the low voltage control circuit unit 63.

In this case, the largeness of the area on the left side and the area on the right side are selected as needed depending on the sizes of the low voltage control circuit unit 63, the drive circuits of the respective phases, and the power supply units.

Specifically, the drive circuit 13 configured to drive the U-phase switching element Sn1, and the drive circuit 14 configured to drive the switching element Sn2, which is the companion of the switching element Sn1, are arranged in the left side area of the control substrate 61 illustrated in FIG. 7. The control terminals 43 of the IGBTs, which correspond to the switching element Sn1 and the switching element Sn2, are electrically connected to each of the drive circuit 13 and the drive circuit 14.

The transformer unit 34 which constitutes the power supply unit 33 and the power IC 36 having the MOS FET switching element 35 integrated therein are arranged between the drive circuit 13 and the drive circuit 14. The power IC 36 may be provided separately from the switching element 35, and in this case, the switching element 35 is arranged near the power IC 36.

Here, the drive circuit 13 and the drive circuit 14 are arranged side by side in the drawing. In other words, these drive circuits are arranged in two levels in a longitudinal direction so that either one opposes the low voltage control circuit unit 63.

In the same manner, the drive circuit 15 configured to drive the V-phase switching element Sn3, and the drive circuit 16 configured to drive the switching element Sn4, which is the companion of the switching element Sn3, are arranged in the left side area of the control substrate 61 illustrated in FIG. 7. The control terminals of the IGBTs, which correspond to the switching element Sn3 and the switching element Sn4, are electrically connected to each of the drive circuit 15 and the drive circuit 16.

The transformer unit 34 which constitutes the power supply unit 33, which is specific for the V-phase, and the power IC 36 having the MOS FET switching element 35 integrated therein are arranged between the drive circuit 15 and the drive circuit 16. The power IC 36 may be provided separately from the switching element 35, and in this case, the switching element 35 is arranged near the power IC 36.

Here, the drive circuit 15 and the drive circuit 16 are arranged side by side in the drawing. In other words, these drive circuits are arranged in two levels in the longitudinal direction so that either one opposes the low voltage control circuit unit 63.

In addition, the drive circuit 17 configured to drive the W-phase switching element Sn5, and the drive circuit 18 configured to drive the switching element Sn6, which is the companion of the switching element Sn5, are arranged in the left side area of the control substrate 61 illustrated in FIG. 7. The control terminals of the IGBTs, which correspond to the switching element Sn5 and the switching element Sn6, are electrically connected to each of the drive circuit 17 and the drive circuit 18.

The transformer unit 34 which constitutes the power supply unit 33, which is specific for the W-phase, and the power IC 36 having the MOS FET switching element 35 integrated therein are arranged between the drive circuit 17 and the drive circuit 18. The power IC 36 may be provided separately from the switching element 35, and in this case, the switching element 35 is arranged near the power IC 36.

Here, the drive circuit 17 and the drive circuit 18 are arranged side by side in the drawing. In other words, these drive circuits are arranged in two levels in the longitudinal direction so that either one opposes the low voltage control circuit unit 63. Combinations of the drive circuit, the power supply units, and the drive circuit are mounted for the respective phases in three rows.

Electrical transmission of control signals between the low voltage control circuit unit 63 and each of the drive circuit 13 to the drive circuit 18 is performed by the U-phase photo couplers 47, the V-phase photo couplers 48, and the W-phase photo couplers 49 interposed between the low voltage control circuit unit 63 and each of the drive circuit 13 to the drive circuit 18.

Here, the U-phase photo couplers 47, the V-phase photo couplers 48, and the W-phase photo couplers 49 are positioned practically on the same line. In other words, since the drive circuits of the respective phases are arranged so as to oppose the one side of the low voltage control circuit unit 63, all the photo couplers 47 to 49 may be arranged along the one side of the low voltage control circuit unit 63. As a matter of course, the photo coupler and the drive circuit 13 to the drive circuit 18 are connected respectively by wiring.

The arrangement of the circuit components of the control substrate 61 as described above is mainly characterized in that (1) the drive circuit 13 to the drive circuit 18 of the respective phases are arranged in two levels in the longitudinal direction so as to oppose the one side of the low voltage control circuit unit 63 and a half thereof is arranged, (2) the transformer units and the power IC (if the MOS FET is not integrated, the MOS FET is arranged separately) as the power supply units specific for the respective phases are arranged between the drive circuits of the switching element pairs in the respective phases, and (3) the U-phase photo couplers 47, the V-phase photo couplers 48, and the W-phase photo couplers 49 are arranged on the same line along the one side of the low voltage control circuit unit 63.

With the arrangement structure described above, the power supply units and the drive circuits may be arranged rationally for the respective phases independently.

In this embodiment as well, as illustrated in the second embodiment, a configuration in which the drive circuit 13 and the drive circuit 14, the drive circuit 15 and the drive circuit 16, and the drive circuit 17 and the drive circuit 18 have the substantially the same shape when viewing the paper plane, and, in addition, are arranged symmetrically with respect to the transformer 34 and the power IC 36 as a boundary is also applicable.

The low voltage control circuit unit 63, the photo coupler 47 to the photo coupler 49, each of the drive circuit 13 to the drive circuit 18, and the connecting terminals of the IGBT modules are arranged in this order so as to increase in potential in this direction, an advantageous arrangement is achieved while securing the electrical insulation.

Since the photo couplers are arranged on the same line, the surface area for installing the photo couplers may be reduced as illustrated in FIG. 3 and FIG. 5 and, consequently, an advantage that the surface area of the substrate may be reduced is expected.

REFERENCE SIGNS LIST

10 . . . electric motor, Sn1 to Sn6 . . . switching element composed of IGBT, 13 to 18 . . . drive circuit, 30 to 32 . . . unit IGBT module, 33 . . . power supply unit, 34 . . . transformer unit, 35 . . . switching element composed of MOS FET, 36 . . . power IC, 38 . . . primary winding, 39, 40 . . . secondary winding, 41 . . . case, 42 . . . outer wall, 43 . . . control terminal, 44 . . . control substrate, 45 . . . terminal hole, 46 . . . low voltage control circuit unit, 47 . . . U-phase photo coupler, 48 . . . V-phase photo coupler, 49 . . . W-phase photo coupler, 50 . . . case, 51 . . . outer wall, 52 . . . control substrate, 53 . . . terminal hole, 54 . . . low voltage control circuit unit, 60 . . . case, 61 . . . control substrate, 62 . . . terminal hole, 63 . . . low voltage control circuit unit.

The invention claimed is:

1. An automotive vehicle inverter control apparatus comprising:

a pair of U-phase power semiconductor elements connected to a U-phase winding of an electric motor;

a pair of V-phase power semiconductor elements connected to a V-phase winding of the electric motor;

a pair of W-phase power semiconductor elements connected to a W-phase winding of the electric motor; a pair of U-phase drive circuits configured to drive the U-phase power semiconductor element;

a pair of V-phase drive circuits configured to drive the V-phase power semiconductor element; a pair of W-phase drive circuits configured to drive the W-phase power semiconductor element;

a U-phase side direct current power source configured to supply power only to the pair of U-phase drive circuit via a U-phase side power supply path;

a V-phase side direct current power source separate and distinct from the U-phase side direct current power source, the V-phase side direct current power source configured to supply power only to the pair of V-phase drive circuit via a V-phase side power supply path; and a W-phase side direct current power source separate and distinct from the U-phase side direct current power source and the V-phase side direct current power source, the W-phase side direct current power source configured to supply power source only to the pair of W-phase drive circuit via a W-phase side power supply path, and wherein each of the U-phase side direct current power source, the V-phase side direct current power source, and the W-phase side direct current power source includes a power supply unit having a transformer unit, a power source IC, a switching element having a gate connection that is solely connected to the power source IC, and a capacitor, and wherein each of the power supply unit is connected to the respective U-phase side power supply path, V-phase side power supply path, and the W-phase side power supply path.

2. The automotive vehicle inverter control apparatus according to claim 1, wherein an emitter of one of the pair of U-phase power semiconductor elements and a collector of the other one of the pair of U-phase power semiconductor elements are connected to the U-phase winding, an emitter of one of the pair of V-phase power semiconductor elements and a collector of the other one of the pair of V-phase power semiconductor elements are connected to the V-phase winding, and an emitter of one of the pair of W-phase power semiconductor elements and a collector of other one of the pair of W-phase power semiconductor elements are connected to the W-phase winding, gates of the pair of U-phase power semiconductor elements are connected to the pair of U-phase drive circuits respectively, gates of the pair of V-phase power semiconductor elements are connected to the pair of V-phase drive circuits respectively, and gates of the pair of W-phase power semiconductor elements are connected to the pair of W-phase drive circuit respectively, and the pair of U-phase drive circuits is connected to the U-phase side direct current power source, the pair of V-phase drive circuit is connected to the V-phase side direct current power source, and the pair of W-phase drive circuits is connected to the W-phase side direct current power source.

3. The automotive vehicle inverter control apparatus according to claim 2, wherein the transformer unit of the U-phase side direct current power source, the transformer unit of the V-phase side direct current power source, and the transformer unit of the W-phase side direct current power source include at least an iron core, each including a primary winding, and a secondary winding connected to respective drive circuits.

4. An automotive vehicle inverter control apparatus comprising:

a power semiconductor module including a power semiconductor element configured to convert a direct current into a three-phase alternating current and drives an electric motor and a drive circuit configured to drive the power semiconductor module, wherein the power semiconductor module and the drive circuit include first, second, and third unit semiconductor modules and first, second, and third unit drive circuits corresponding to the three-phase alternating current, and a first power supply unit configured to supply power only to the first unit drive circuit via a first power supply path, a second power supply unit separate and distinct from the first power supply unit, the second power supply unit configured to supply power only to the second unit drive circuit via a second power supply path, and a third power supply unit separate and distinct from the first and second power supply units, the third power supply unit configured to supply power only to the third unit drive circuit via a third power supply path, and wherein each of the first power supply unit, the second power supply unit, and the third power supply unit includes a power supply unit having a transformer unit, a power source IC, a switching element having a gate connection that is solely connected to the power source IC, and a capacitor, and wherein each of the power supply unit is connected to the respective first, second, and third power supply paths.

* * * * *